United States Patent [19]
Haraikawa

[11] 3,920,103
[45] Nov. 18, 1975

[54] AUTOMATIC GAP ADJUSTER FOR A DISC BRAKE UNIT

[75] Inventor: Tetsuo Haraikawa, Funabashi, Japan

[73] Assignee: Tokico Ltd., Kawasaki, Japan

[22] Filed: Feb. 11, 1974

[21] Appl. No.: 441,521

[30] Foreign Application Priority Data
Feb. 9, 1973 Japan.................. 48-16263

[52] U.S. Cl. ........... 188/71.9; 188/72.6; 188/196 D
[51] Int. Cl.² ...................................... F16D 55/224
[58] Field of Search ........ 188/71.9, 71.8, 72.6, 370, 188/196 D, 196 BA

[56] References Cited
UNITED STATES PATENTS

| | | | |
|---|---|---|---|
| 3,331,472 | 7/1967 | Swift ................................ | 188/71.9 |
| 3,410,373 | 11/1968 | Pace ................................. | 188/71.9 |
| 3,584,711 | 6/1971 | Margetts .................... | 188/196 B A |
| 3,621,944 | 11/1971 | Langley ..................... | 188/196 B A |
| 3,688,875 | 9/1972 | DeHoff et al. ...................... | 188/71.9 |
| 3,724,605 | 4/1973 | Naismith et al................... | 188/71.8 |
| 3,731,772 | 5/1973 | Toshida et al. ...................... | 188/370 |
| 3,762,513 | 10/1973 | Farr ................................. | 188/72.6 |
| 3,770,082 | 11/1973 | Brooks et al....................... | 188/71.9 |

Primary Examiner—Trygve M. Blix
Assistant Examiner—Edward R. Kazenske
Attorney, Agent, or Firm—Sughrue, Rothwell, Mion, Zinn & Macpeak

[57] ABSTRACT

In a vehicle wheel disc brake unit, there is provided an atmospheric pressure chamber in the closed end of a hollow hydraulic piston adapted for actuation of one of both friction pads for the disc, and in front of a gap adjusting nut mounted threadedly on an adjusting bolt. This nut establishes normally a small predetermined length of axial idle gap formed between the nut and a correspondingly shaped portion on the inside wall surface of the piston. These normally gap-forming portions on the nut and piston constitute in combination a kind of a cone clutch.

1 Claim, 4 Drawing Figures

AUTOMATIC GAP ADJUSTER FOR A DISC BRAKE UNIT

BACKGROUND OF THE INVENTION

This invention relates generally to vehicle disc brakes, or more specifically, it relates to improvements in and relating to an automatic gap adjuster built-in in the disc brake unit.

In the vehicle disc brake unit of the above kind, comprising a disc rotatable in unison with one of the traveling wheels of the vehicle and a pair of brake pads adapted for frictionally cooperating with said disc from the both sides thereof, a small axial idle gap must be provided between the disc and each of the brake pads, when the brake unit is in its off-service position. At the same time, when the brake unit is in its off-service position, a small axial idle gap must be provided between a part of a nut member mounted on the male threaded part of an adjuster bolt, and a correspondingly shaped part on the inside wall surface of a piston adapted for actuation of the pads directly and indirectly, as will become more apparent as the description proceeds.

When the pad clearances as above mentioned are expressed by $C_1$ and $C_2$, the sum being called frequently "actual pad clearance" among those skilled in the art, and the adjuster nut-piston clearance as above mentioned and called frequently "built-in clearance", is expressed by $C$, while the overall axial and elastic deformation as appearing in the brake housing or calliper as well as the brake pads during a brake application are expressed by $f(p)$, then the following equation will be established.

$$(C_1 + C_2) = C - f(p)$$

wherein, $f(p)$ is variable with the hydraulic brake pressure "$p$" and in the form of a monotone increasing function.

In order to avoid an excess brake gap adjustment for the following condition:
$C_1 - C_2 < 0$
The following design condition:
$C > f(p_{max})$
where, $p_{max}$ stands for a maximum allowable hydraulic brake pressure,
must be adopted. By this reason, the built-in clearance $C$ must have a considerably large value, such as 1 mm or so. On the other hand, the actual pad clearance varies with the latestly applied hydraulic brake pressure and thus, the manual brake lever stroke may be for each brake application subjected defectively to appreciable variation. As is commonly known, the manual brake lever is mechanically connected with the hydraulic brake piston, so as to manipulate the latter for emergency or parking service.

SUMMARY OF THE INVENTION

It is therefore a main object of the invention to provide a vehicle wheel brake unit with a built-in automatic brake gap adjuster, capable for preventing an excess gap adjustment by invalidating the gap adjusting function beyond a predetermined hydraulic braking pressure even if applied.

A still further object is to provide a brake unit of the above kind in which the manual brake lever stroke is kept substantially constant, irrespective of substantial variations in the applied hydraulic brake pressure.

These and further objects, features and advantages of the invention will become more apparent when read the following detailed description thereof by reference to the accompanying drawing illustrative of a preferred embodiment of the invention shown only by way of example.

DETAILED DESCRIPTION OF THE INVENTION

Figure 1:
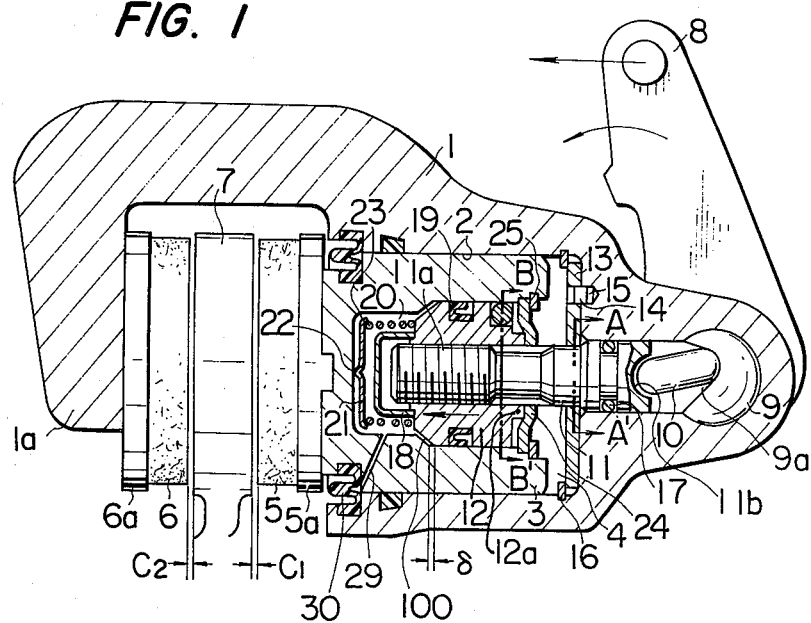
FIG. 1 is an axial section of essential parts of a disc type and combined manual and hydraulic vehicle wheel brake unit wherein, however, the brake disc is shown only partially and in its elevation and brake pads together with respective backing plates are shown in their elevation.

Referring now to the drawings, a preferred embodiment of the present invention will be described in detail.

In FIG. 1, numeral 1 represents a housing, called "caliper" among those skilled in the art, which is shown only in its axial section and mounted slidably to-and-fro in the horizontal directions on the chassis of a vehicle, not shown. The housing 1 is formed with a horizontal cylinder bore 2 having a closed outer end and an open inner end opening towards a conventional brake disc 7 only shown partially. A cup-shaped cylindrical piston 3, closed at its inner end and opened at its outer end, is slidably mounted in the bore 2. Numeral 4 represents a hydraulic pressure chamber formed in the cylinder bore 2 and partially and variably defined by the piston 3.

Numeral 5 represents a brake pad adapted for frictionally cooperating with the brake disc 7 and rigidly attached to a backing plate 5a which is mounted on the closed end of said piston 3 for performing unitary movement therewith. Normally, when the brake unit is kept at its off-service position, there is a small gap as shown at $C_1$ between the right-hand surface of brake disc 7 and the outer or operating surface of the pad 5.

A second brake pad 6 is normally kept at an idle gap $C_2$ from the opposite or left-hand surface of brake disc 7 in an opposite relationship with the first pad 5 and fixedly attached to its backing plate 6a which is in turn fixedly attached to a depending arm 1a of the housing 1. When the brake unit is actuated, the second pad 6 is advanced rightwards in unison with the slidable housing 1 against the disc 7 for performing a braking action, as will be described more in detail as the description proceeds.

Numeral 8 represents an operating lever the top end of which is operatingly connected through a cable, not shown, to a conventional parking brake lever, again not shown. The lower end of lever 8 is pivotably mounted on the housing 1 by means of a pivot pin, not shown, which is rigid with a cam 9 having a recess 9a. A push rod 10 engages by its right-hand end with the cam recess 9a and by its left-hand end with a recess 11b formed on the outer end of an adjuster bolt 11 for transmitting motion from the lever 8 to the bolt 11. A nut 12 is threaded on the male-screwed portion 11a of the bolt 11. There is maintained normally an axial idle gap "delta" between the nut 12 and a corresponding inner part on the piston 3.

A key plate 13 is held in position on the closed end wall of the bore 2 by means of a snap spring 16 and formed rigidly with a positioning pin 14 which is snugly inserted into a reception opening 15 formed in the said closed end wall, thereby positively preventing a rotation of key plate 13 around its central axis.

Figure 2:
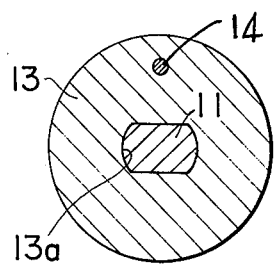
FIGS. 2 and 3 are cross-sections taken along section lines A—A' and B—B' in FIG. 1, respectively.

The adjuster bolt 11 slidably passes through a corresponding shaped central opening 13a, thereby, however, a relative-rotation therebetween being positively prevented by virtue of their relative non-circular engagement, as most clearly be seen from FIG. 2 which is a section taken through a section line A—A' in FIG. 1.

In close proximity of said recess 11b, the adjuster bolt 11 carries a sealing ring 17 for effective prevention of oil leakage thereat occasionally invading from the liquid pressure chamber 4 towards ambient atmosphere.

The screw threads at 11a have a relatively large pitch so that an application of axial thrust force on adjuster bolt 11 may cause the latter to turn in one direction or another, as the case may be, depending upon the sense of the thurst. The inner or left-hand end of said nut 12 is sealed off around its tapped axial bore by means of a cup-shaped cover member 18 fixedly attached to said nut by pressure fit, welding or the like conventional attaching means.

An air chamber 20 is provided around the cover cup 18 and within the left-hand closed bore space of the piston 3. A rubber seal 19 is provided between the piston 3 and nut 12 for the prevention of otherwise possible oil leakage from said pressure oil chamber 4 into the air chamber 20 filled with atmospheric pressure air.

Around the cup cover 18, there is provided a coil spring 23 the inner end of which abuts against nut 12, while the outer opposite end of the same spring abuts on a disc-shaped seat 21 having a center projection 22 for floatingly abutting against the inner bottom wall surface of the closed end of piston 3.

The air chamber 20 communicates open atmosphere through a small passage port 29 the outer end of which is normally and lightly closed by a rubber-made dust-prevention boot 30 received jointly by housing 1 and piston 3. The passage port 29 is adapted additionally as lead means for the escapement of leaked-in oil from the air chamber to outside. By the coil spring 23, the adjuster bolt-and-nut assembly receives a resilient axial thrust towards right in FIG. 1.

Figure 3:
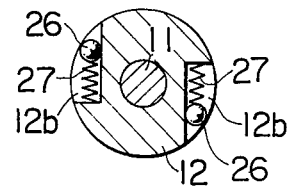

At the right-hand open end of piston 3, a ring-shaped retainer 24 is mounted on the inner wall surface of piston 3 and held in position by a snap spring 25. This retainer ring 24 normally abuts against the outer end of an axial flange portion 12a integral with the nut 12, so as to normally maintain the said idle gap "delta". The adjuster bolt 11 passes through a correspondingly shaped central bore of the retainer 24. As shown more specifically in FIG. 3 illustrating a cross-section taken along a section line B–B' in FIG. 1, the nut 12 is formed on its outer periphery a pair of reception recesses in close proximity to said axial flange 12a, as denoted with a common numeral 12b. A stop ball 26 and a pressure spring 27 are inserted in each of these recesses, so as to allow the nut 12 to turn exclusively in its disengaging direction.

The operation of the aforementioned hydraulic brake unit is as follows:

When the brake unit is to be actuated, pressure oil is supplied from a supply source, not shown, preferably a conventional master cylinder, through a brake piping and a communication opening kept in fluid communication with the chamber 4 although not shown by virtue of its well known location, to the latter chamber. By this pressure oil supply to the chamber 4, the piston 3 is hydraulically urged to move leftwards in FIG. 1, so as to bring the first pad 5 into contact with the possibly rotating brake disc 7 at its right-hand surface, upon filling up the normally held idle gap $C_1$. At the same time, the housing 1 is moved rightwards in FIG. 1, by receiving the hydraulic reaction transmitted thereto from the oil pressure chamber 4, thereby the second pad 6 being brought into pressure contact with the left-hand surface of the brake disc, upon filling up the related idle gap $C_2$. In this way, the brake disc is subjected to frictional braking force at its opposite working surfaces by being squeezed under pressure by these pads 5 and 6 from the both sides.

On the other hand, when it is desired to actuate the brake manually and thus without any aid of the hydraulic pressure, the operating lever 8 is turned counter clockwise in FIG. 1 by manual actuation of the parking brake lever, not shown, thus a push being transmitted from the cam 9 through pusher rod 10 to the adjuster bolt 11 which is caused thereby to slide leftwards in FIG. 1. In this way, the nut 12 is caused also to move horizontally leftwards in FIG. 1 and in unison with the adjuster bolt, until the idle gap "delta" normally appearing at a friction clutch portion 100 will have been filled up. Then, axial thrust will be applied to the first pad 5 through the intermediary of the slidable piston 3, whereupon the pad will act as a friction braking element upon the disc 7. Similar to the hydraulic brake operation of the unit, the second pad 6 will be brought into operation by the rightward sliding movement of the housing 1 caused by the reactive force applied thereto. In this case, however, the reaction is not of the hydraulic nature, but of the mechanical one, as is commonly known to those skilled in the art.

The turning torque $T_1$ as applied to the nut 12 caused by the hydraulic liquid pressure p during the hydraulic braking operation may be calculated in the following manner:

$$T_1 = k_1 \cdot A_b \cdot p$$

where, $A_b$ stands for the effective oil pressure-receiving cross-sectional area taken at the sealed portion at 17; $k_1$ stands for a constant which is determined depending upon effective screw diameter, screw pitch, screw angle and configuration, friction coefficient between bolt 11 and nut 12.

The axial thrust $f_n$ acting on nut 12 will be:

$$f_n = (A_n - A_b) \cdot p - f_s$$

where, $A_n$ stands for the effective hydraulic pressure-receiving cross-sectional area of nut 12 as measured at 19; $f_s$ stands for normal urging pressure exerted by spring 23 on nut 12;

Therefore, when $f_n < 0$ and thus $$P < \frac{f_s}{A_n - A_b},$$

the torque $T_2$ by which the nut 12 rotates will be:

$$T_2 = k_2 \{f_s - (A_n - A_b) \cdot p\} + T_s$$

where, $T_s$ stands for the rotational resistance applied to nut 12 by the provision of seal 19; $k_2$ stands for a coeffecient as determined depending upon the effective radius at the contact point between nut 12 and retainer 24, as well as the friction coefficient between the both members;

When $f_n \geq 0$ and thus $$p > \frac{f_s}{A_n - A_b},$$

then $T_2$ will be:

$$T_2 = k_3 \{(A_n - A_b) \cdot p - f_s\} + T_s$$

where, $k_3$ stands for a constant as determined depending upon the coefficient at the contacting portion between piston and nut, the effective radius thereat and the contacting angle therebetween.

Figure 4:
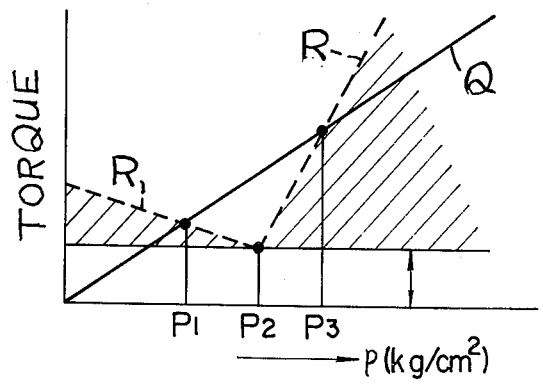
FIG. 4 is a performance chart of the hydraulic brake unit shown above, wherein torque (mm-kgs.) has been plotted against hydraulic brake pressure (kgs/cm$^2$) at a random scale.

The above-mentioned relationships are illustrated on the chart shown in FIG. 4 wherein the nut-turning torque (kg-mm) has been plotted against the hydraulic brake pressure, $p$ (kg/cm$^2$). In this chart, the full line curve Q represents the urging turning torque acting upon the nut 12, while the broken dotted line curve R represents the braking torque against rotation of the same nut. Two crossing points $P_1$ and $P_3$ are also shown as determined by and between these curves Q and R.

At the lowest point $P_2$ of the curve R, the nut-and-bolt assembly 11; 12 is substantially in its axially floating condition, thus the nut being subjected to a turning resistance, substantially provided by the sealing member 19.

In the pressure region defined by and between $P_1$ and $P_3$, nut 12 can revolve, while in the higher oil pressure region than that corresponding to $P_3$, the nut can not turn; thus no brake gap adjusting operation.

The aforementioned built-in clearance C may be expressed by:

$$C = C_0 - \text{"delta"}$$

where, $C_0$ stands for conventionally unavoidable idle screw clearance appearing between the male and female threads on the bolt 11 and the nut 12, respectively.

In this case, $k_3$ is larger than $k_2$. This is due to the fact that the effective radius at the frictionally cooperating parts and relative to $k_3$ is larger than that relative to $k_2$, on the one hand, and that the related frictional engagement is established at the coned portions illustrated commonly at 100 in FIG. 1, on the other.

Therefore, by selecting the specific hydraulic brake pressure appearing at the point $P_3$ to be smaller than the normal working hydraulic brake pressure, say 20 kg/cm$^2$, $$f(p) = \text{constant}$$

and therefore, the sum $C_1 + C_2$ will become also constant.

By adopting the aforementioned conditions and thanks to the provision of the air chamber 20, preferably atmospheric, an excess or over brake gap adjustment can be positively and effectively avoided. In addition, the built-in clearance can be nevertheless minimized as to, say 0.5 mm or so which corresponds to about ½ of the normal values. In addition, the manual brake stroke can be reduced considerably from those conventionally employed, say about ½ of the normal, and maintained substantially at a constant length, regardless of the hydraulic brake pressure directly beforehand.

The gap adjusting operation principle per se is just same as conventional and could be obviated without prejudice for understanding of the present invention. It should be mentioned, however, that the nut can not turn upon realization of cone-clutch-like pressure contact at 100 with the corresponding inside wall surface of the hollow piston. It should be further noted that although the air chamber 20 is filled with atmospheric air in the present invention, it is filled with oil in the conventional unit. By the provision of this air chamber, the nut can easily advance relative to the piston in the hydraulic as well as manual operation of the brake unit.

The embodiments of the invention in which an exclusive property or privilege is claimed are as follows:

1. In a disc brake unit for a vehicle wheel having a brake disc secured thereto, a caliper adapted to straddle at least a portion of the periphery of said disc and having a cylinder formed in one leg thereof, a hollow piston slidably and sealingly mounted in said cylinder, said piston having a closed end for operative engagement with a friction member, a gap adjuster bolt non-rotatably and axially slidably extending through said leg and into said hollow piston along the central axis of said piston, a nut disposed in threaded engagement with the end of said bolt within said piston and in fluid tight sliding engagement with the inner surface of said hollow piston to define an air chamber within said piston, said nut and the inner surface of said hollow piston being provided with complementary axially spaced beveled coupling surfaces within said air chamber and spring means disposed in said chamber for normally biasing said surfaces axially apart, and, passage means communicating said air chamber with the external atmosphere.

* * * * *